3,184,510
N-ALKOXY-β-PHENYLETHYLAMINES AND β-HYDROXY-β-PHENYLETHYLAMINES
Joseph Levy, Paramus, N.J., assignor, by mesne assignments, to Universal Oil Products Company, Des Plaines, Ill., a corporation of Delaware
No Drawing. Filed Dec. 5, 1960, Ser. No. 73,550
13 Claims. (Cl. 260—570.6)

This invention relates to a new class of chemical compounds which have important pharmacological properties and may be defined as N-alkoxy-β-phenylethylamines and their hydroxy, lower alkyl, and methoxy derivatives as well as the non-toxic salts of such compounds. The invention further relates to methods by which these new compositions can be produced.

The compounds of the present invention may be represented by the formula

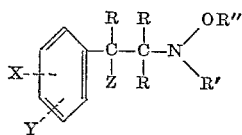

where X and Y are selected from the group consisting of hydrogen, hydroxyl, and methoxy groups; Z is hydrogen or a hydroxyl group; R is hydrogen or a methyl group; R' is hydrogen or a methyl, ethyl, propyl, or isopropyl group; and R" is a methyl, ethyl, propyl, or isopropyl group.

Compounds having the above formula form addition salts with both mineral and organic acids and the non-toxic salts of such compounds are embraced within the scope of the invention.

Accordingly, the principal object of the present invention is to provide a new class of chemical compounds which are N-alkoxy-β-phenylethylamines and their hydroxy, methoxy, and lower alkyl substituents and non-toxic salts.

A further object of the invention is to provide novel methods by which such compounds may be produced. These and other objects and features of the present invention will appear from the following description thereof wherein reference is made to typical compounds and methods of manufacture for the purpose of indicating the nature of the invention but without intending to limit the scope of the invention thereby.

In general the N-alkoxy amines of the present invention and their non-toxic salts have pharmacological properties similar to those of the well known corresponding phenylethylamines. Thus, they are useful for raising and sustaining blood pressure; they exhibit varying degrees of activity as sympathomimetic drugs for use as local vasoconstrictors and they may be employed in the relaxation of the smooth muscle of the bronchi and intestinal tract, in dilation of the pupil of the eye, and in general produce responses that simulate those obtained by stimulation of adrenergic nerves. In at least some instances they are of greater value than the corresponding amines by reason of their lower toxicity and reduced side effects.

The alkoxyamine compounds of the present invention are relatively weak bases as compared to the corresponding amines wherein hydrogen is present in place of the alkoxy group on the nitrogen atom. Thus, for example, they cannot be titrated readily in aqueous solution. However, they can be titrated with strong acids by the well known techniques for titration of weak bases in non-aqueous media. Despite their relatively weak basicity, the compounds readily form acid addition salts with both mineral and organic acids. Any non-toxic acids may be used such as hydrochloric, sulfuric, phosphoric, tartaric, acetic, citric, maleic, and succinic.

Certain of the compounds of the present invention contain an asymmetric carbon atom, and therefore, are obtained as racemic mixtures of dextro- and laevorotatory optical isomers which can be separated by crystallization of their salts with optically active acids. The individual isomers, therefore, are to be considered as embraced within the scope of this invention.

The N-alkoxy-β-phenylethylamines wherein the phenyl group is either substituted or unsubstituted, can readily be produced by reacting the desired β-phenylethyl halide, sulfate, toluenesulfonate, or the like with a lower alkoxyurethane in the presence of an alkali with subsequent saponification. These reactions may be represented by the equations:

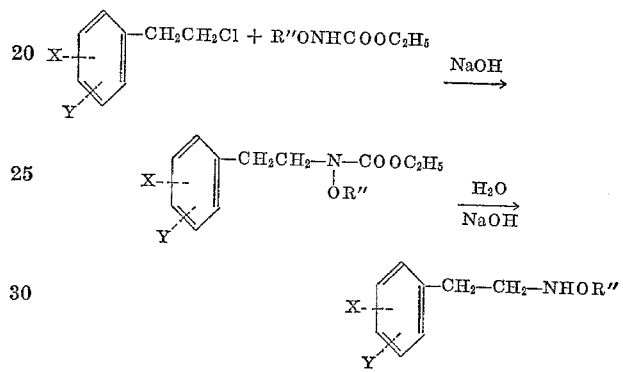

In producing compounds of the present invention wherein the ethyl group of the beta-phenylethyl moiety is substituted with a methyl group to provide for example, a beta-phenylisopropyl or a substituted beta-phenylisopropyl moiety, it is more desirable to effect the synthesis by way of the corresponding phenylacetone derivative which can be converted to its oxime by reaction with hydroxylamine. The resulting oxime in turn is reacted with a lower alkyl halide, sulfate, toluenesulfonate, or the like, in the presence of alkali to produce the lower alkyl ether of the oxime and the latter is then reduced, for example, by means of hydrogen and a catalyst, to produce the desired N-alkoxy-beta-phenylisopropylamine. Alternately, the oxime ether may be prepared by reacting the phenylacetone derivatives with an alkoxy amine.

This alternate procedure is preferred when X or Y are hydroxyl groups. Such reactions may be represented as follows:

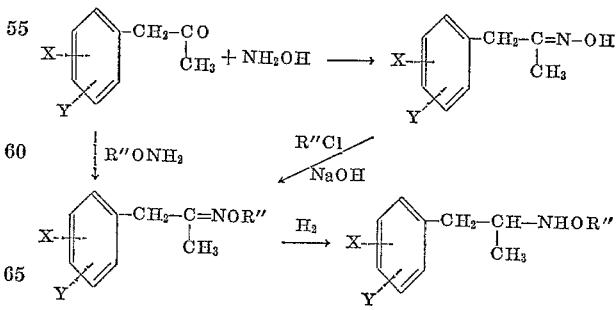

In producing those compounds which have a hydroxyl group attached to the beta carbon atom of the ethyl side chain, a phenacyl halide may be reacted with a lower alkoxyamine and the resulting product submitted to reduction whereby the ketonic function is reduced to a hydroxyl group. Such reactions may be represented as follows:

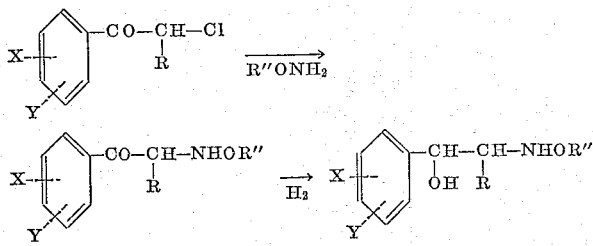

Alternately the corresponding halohydrin may be used.

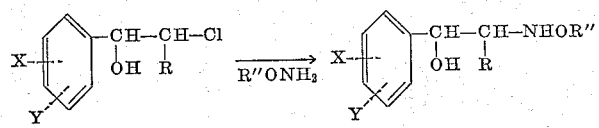

If it is desired to produce compounds which are further alkylated on the nitrogen atom, the alkoxyamines may be reacted with an appropriate lower alkyl halide in accordance with well known alkylation procedures.

When X, Y, or Z are hydroxyl, the hydroxyl group may be protected, if necessary, in the reactions described herein by, for example, an acetyl, benzoyl, benzyl, or benzhydryl group. Such protecting groups can be removed subsequently by saponification or by hydrogenolysis procedures.

The particular method of synthesis selected for the production of any specific compound will depend primarily upon the nature of the substituent groups, if any, which are attached to the phenyl and/or ethyl groups of the beta-phenylethyl portion of the molecule.

In order to illustrate typical procedure in accordance with the present invention, the following examples are cited.

*Example I*

1205 gms. phenylacetoxime, 1000 gms. hexane, and a solution of 430 gms. potassium hydroxide in 3000 gms. water were charged in a flask fitted with a stirrer, dropping funnel, and reflux condenser. 1800 gms. of dimethyl sulfate was then gradually added during a period of about seven hours at about 40–45° C. The hexane layer was then separated from the aqueous layer and washed with 1000 gms. water. After removing the hexane the remaining material was distilled to give 779 gms. of a product distilling at about 80° C. at 3–5 mm. of pressure. This product was shown to be a 55–45% mixture of the desired phenylacetoxime-O-methyl ether and phenylacetone. It was used for the subsequent reduction without further purification as follows:

73.5 gms. of the above described mixture of phenylacetoxime-O-methyl ether and phenylacetone were dissolved in 190 ml. of a 1.5 N ethanolic HCl solution and 1.1 gms. platinum oxide catalyst added. The mixture was then agitated under an atmosphere of hydrogen at an initial pressure of about 60 p.s.i. Reaction proceeded with absorption of hydrogen and ceased after a drop of about 24 p.s.i. had taken place. The catalyst was then filtered and the solution diluted with 800 gms. water. The mixture was then extracted with two 170 gm. portions of benzene to remove non-basic material and the aqueous layer separated and rendered alkaline with a solution of about 15 gms. of potassium hydroxide in 100 gms. water. The liberated oil was then extracted twice with 170 gms. benzene and the combined benzene extracts distilled. After removing the benzene there was collected 15 gms. product distilling at 72–92° C. at 7–7 mm. of pressure. Redistillation gave 14.4 gms. of the N-methoxy-beta-phenylisopropylamine distilling at 50–54° C. at about 3 mm. of pressure. The product was soluble in aqueous solutions of both inorganic and organic acids. It was a relatively weak base which could not be titrated in aqueous solution but analyzed 97.5% by a non-aqueous titration procedure. This product is a racemic mixture of two optically active isomers which can be separated by well known techniques of fractional crystallization of their salts with an optically active acid.

*Example II*

52.5 gms. N-hydroxyurethane (0.5 mole) were added to a solution of 33 gms. potassium hydroxide (0.5 mole) in 250 gms. ethanol followed by 75 gms. methyl iodide (0.53 mole). Reaction took place with evolution of heat and the temperature of the mixture rose to about 85° C. The mixture was then stirred and heated to reflux and maintained for about one and one quarter hours. The mixture was again treated with a solution of 33 gms. potassium hydroxide in ethanol followed by 92 gms. (0.5 mole) of beta-phenylethyl bromide. After refluxing for an additional four hours, the mixture was cooled to room temperature and the precipitated inorganic salts filtered. The alcoholic solution was then distilled to about 100° C. to remove the bulk of the ethanol and the residual material diluted with 170 gms. benzene and extracted with three 50 gm. portions of 5% aqueous sodium hydroxide solution to remove any acidic products. The benzene extract was then distilled until the solvent had been removed leaving 76 gms. of residual oil. To this was added 175 gms. ethanol plus 146 gms. of 45% aqueous potassium hydroxide and the mixture refluxed for bout ½ hour. It was then diluted with 300 gms. water and extracted three times with 85 gms. benzene. The combined benzene extracts were then in turn extracted three times with 100 gms. of 3 N hydrochloric acid. Upon making this acid solution basic with aqueous potassium hydroxide, an oil separated, which was extracted with benzene and distilled to give 17.7 gms. of the desired N-methoxy-beta-phenylethylamine boiling from 68–78° C. at about 3 mm. pressure. This product exhibited properties similar to the product of Example I. It formed a crystalline hydrochloric acid addition salt of M.P.=97.8°–100° C., which precipitated upon treatment of an ether solution of the base with gaseous anhydrous hydrogen chloride. It also formed a crystalline salt with phosphoric acid of M.P. 140–142° C.

*Example III*

5.8 gms. N-methoxy-beta-phenylisopropylamine were heated with 4.0 gms. aqueous 33% formaldehyde and 7.5 gms. 90% formic acid at about 100° C. for two hours. Reaction proceeded with evolution of carbon dioxide and the mixture was then treated with 25% aqueous caustic soda until strongly alkaline. The liberated oil was extracted with ether and after evaporating the ether, the oil was distilled to give 4.7 gms. N-methyl-N-methoxy-beta-phenyl-isopropylamine distilling at 84–88° C. at about 3 mm. of pressure.

*Example IV*

The product of Example III was also prepared by reacting N-methoxy-beta-phenylisopropylamine with methyl iodide in ethanol solution at reflux in the presence of potassium carbonate.

*Example V*

O-methoxyphenylacetone is reacted with hydroxylamine hydrochloride in the presence of aqueous sodium hydroxide to form the oxime derivative. This product is then treated with dimethyl sulfate according to the general procedure of Example I to form the corresponding O-methyl ether and the latter compound reduced to give the desired N-methoxy-beta-(o-methoxyphenyl) isopropylamine.

*Example VI* p-Hydroxyphenylacetone is reacted with methoxyamine to form the O-methyl oxime derivative and the latter compound reduced as in the procedure of Example I to produce the desired N-methoxy-beta-(p-hydroxyphenyl) isopropylamine.

*Example VII*

Chloracetocatechol dibenzoate is reduced to the chlorhydrin and the latter compound is reacted with methoxyamine to form the N-methoxyamino derivative. The benzoyl groups are then removed by saponification to produce the desired N-methoxy-beta-hydroxy-beta(3,4-dihydroxyphenyl)ethylamine.

*Example VIII*

Meta-hydroxyacetophenone benzoate is reacted with bromine to produce the alpha-brom compound and then reduced to form the corresponding bromhydrin. Reaction with methoxyamine then replaces the bromine atom with the N-methoxy amino group and the benzoyl group is then removed by saponification to give the desired N-methoxy-beta-hydroxy - beta - (meta-hydroxyphenylethylamine).

From the foregoing examples of compositions and methods embodying the present invention, it will be apparent that various alternative arrangements of the substituents are possible and the methods employed in producing the compounds can be varied considerably to produce the particular compounds desired.

In view thereof it should be understood that the specific compounds and methods cited are intended to be illustrative only and are not intended to limit the scope of the invention.

I claim:
1. A compound of the class consisting of the N-alkoxy-beta-phenylethylamines represented by the formula

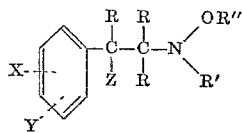

wherein X and Y are selected from the group consisting of hydrogen, hydroxyl, and methoxy groups; Z is selected from the group consisting of hydrogen and a hydroxyl group; R is selected from the group consisting of hydrogen and methyl; R' is selected from the group consisting of hydrogen, methyl, ethyl, propyl and isopropyl; and R'' is selected from the group consisting of methyl, ethyl, propyl, and isopropy, and the salts of non-toxic acids.
2. N-lower alkoxy beta-phenylethylamine.
3. N-lower alkoxy beta-phenylisopropylamine.
4. N-lower alkyl N-lower alkoxy beta-phenylethylamine.
5. N-lower alkyl N-lower alkoxy beta-phenylisopropylamine.
6. Beta-hydroxy-N-lower alkoxy betaphenylethylamine.
7. Beta-hydroxy-N-lower alkoxy beta-phenylisopropylamine.
8. N-methoxy-beta-phenylisopropylamine.
9. N-methoxy-beta-(o-methoxyphenyl)isopropylamine.
10. N-methoxy-beta-hydroxy-beta(3,4-dihydroxyphenyl)-ethylamine.
11. N-methoxy-beta-hydroxy-beta-(meta-hydroxyphenyl)-ethylamine.
12. The method of producing an N-alkoxy-beta-phenylisopropylamine which comprises the steps of reacting a compound selected from the group consisting of phenylacetoxime, mono and dihydroxy phenylacetoximes, and mono and dimethoxy phenylacetoximes with a compound selected from the group consisting of the lower alkyl halides, sulfates, and toluenesulfonates, in the presence of an alkali and then reducing the resulting lower alkyl ether of the oxime and separating the N-alkoxy-beta-phenylisopropylamine produced from the reaction mixture.
13. The method of producing N-methoxy-beta-phenylisopropyl amine which comprises the steps of adding dimethyl sulfate to a mixture of phenylacetoxime and an aqueous alkali solution, separating phenylacetoxime-O-methyl ether produced from the mixture, hydrogenating said ether, and separating the resulting N-methoxy-beta-phenylisopropyl amine from the reaction mixture.

References Cited by the Examiner
UNITED STATES PATENTS

| | | | |
|---|---|---|---|
| 2,712,031 | 6/55 | Huffman | 260—566 |
| 2,832,804 | 4/58 | Richter et al. | 260—566 |
| 3,118,933 | 1/64 | Goldberg et al. | 260—570.8 |

OTHER REFERENCES

Burger: "Medicinal Chemistry," 2nd Ed., pages 75 and 592–620 (1960).

Gilsdorf et al.: "Jour. Amer. Chem. Soc.," volume 74, pages 1837–43 (1952).

Meisenheimer: "Ber.," 52B, pages 1667–77 (1919).

Surratt et al.: "Jour. Amer. Chem. Soc.," volume 72, pages 1561 (1950).

Vavon et al.: "Chemical Abstracts," volume 22, page 2745 (1928).

CHARLES B. PARKER, *Primary Examiner.*